US006272843B1

United States Patent
Schwamm

(10) Patent No.: US 6,272,843 B1
(45) Date of Patent: Aug. 14, 2001

(54) FUEL METERING SYSTEM FOR GAS TURBINE

(75) Inventor: Friedrich Schwamm, Zorneding (DE)

(73) Assignee: MTU Motoren- und Turbinen-Union München GmbH, Munich (DE)

( * ) Notice: Subject to any disclaimer, the term of this patent is extended or adjusted under 35 U.S.C. 154(b) by 0 days.

(21) Appl. No.: 09/582,032

(22) PCT Filed: Oct. 19, 1999

(86) PCT No.: PCT/DE99/03350

§ 371 Date: Jun. 21, 2000

§ 102(e) Date: Jun. 21, 2000

(87) PCT Pub. No.: WO00/23700

PCT Pub. Date: Apr. 27, 2000

(30) Foreign Application Priority Data

Oct. 21, 1998 (DE) .............................. 198 48 434

(51) Int. Cl.[7] ....................................... F02C 9/26
(52) U.S. Cl. ....................................... 60/39.281
(58) Field of Search ..................... 60/39.281, 243

(56) References Cited

U.S. PATENT DOCUMENTS

| 2,510,617 | 6/1950 | Barr | 277/53 |
|---|---|---|---|
| 4,195,971 | 4/1980 | Graham | 417/366 |
| 4,578,945 | 4/1986 | Peck et al. | 60/29.281 |
| 4,667,639 | 5/1987 | Linder et al. | 123/450 |
| 4,736,582 | 4/1988 | Smith | 60/39.281 |
| 4,760,662 | 8/1988 | Dyer et al. | 60/39.281 |
| 4,817,376 | 4/1989 | Brocard et al. | 60/39.281 |

FOREIGN PATENT DOCUMENTS 195 45 987   6/1997   (DE) .

*Primary Examiner*—Louis J. Casaregola
(74) *Attorney, Agent, or Firm*—Evenson, McKeown, Edwards & Lenahan, P.L.L.C.

(57) ABSTRACT

A fuel metering system for a turbojet engine includes (1) a pump-supplied feed pipe; (2) a supply pipe to the engine; (3) a recirculation pipe; (4) a main metering valve; (5) a pressure control device for the main metering valve; (6) an emergency device for an unintentional opening of the main metering valve; and (7) an automatic pressure limiting device for the pipe system. Control-related connections of the main metering valve and the emergency device exist to an electronic engine controller. The pressure control device and the emergency device are combined in a recirculation valve and are controlled by the engine controller.

4 Claims, 1 Drawing Sheet

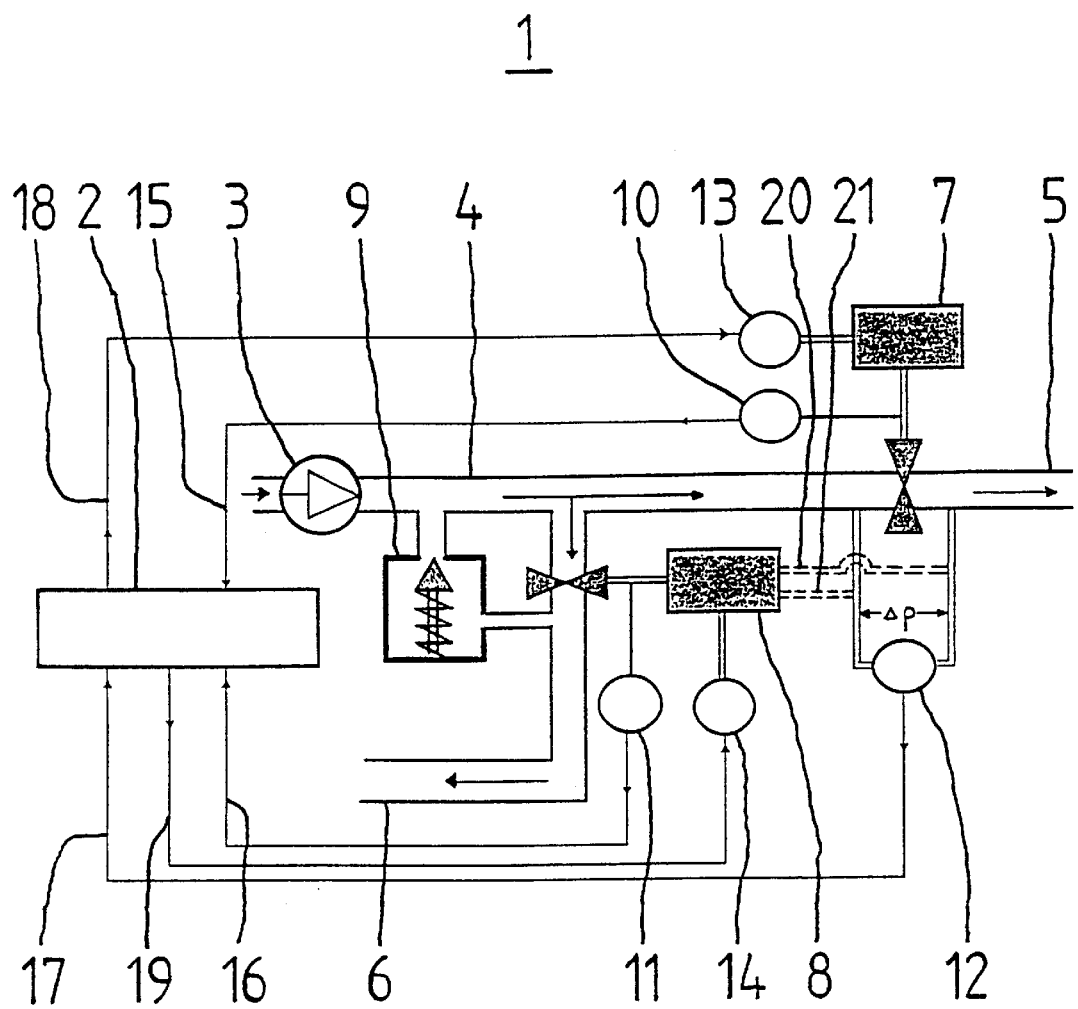

FUEL METERING SYSTEM FOR GAS TURBINE

BACKGROUND OF THE INVENTION

The invention relates to a fuel metering system for a turbojet engine.

A fuel metering system is used in the case of the EJ 200 engine in the Jäger 90/EFA airplane. Here, the pressure control device is constructed as an independently operating pressure control valve influenced only by the differential pressure at the main metering valve. The emergency device is formed by a separate emergency valve controlled by the engine controller. In the event of an unintentional opening of the main metering valve, the emergency valve is controlled by the engine controller so that, as a result of recirculation, the fuel amount reaching the engine is limited. However, the opening of the emergency valve causes a simultaneous closing of the automatic pressure control valve which aims at keeping the pressure drop at the main metering valve constant. Thus, the pressure control valve compensates the effect of the emergency valve during the change-over operation from the normal to the emergency operation. During this "dead time", as a result of an excess of fuel until the effective intervention of the emergency valve, there will be rotational speed overshoots of up to 15%. These have to be taken into account when designing the stability of the rotating engine components, causing these to be heavier and more voluminous.

In contrast, it is an object of the invention to provide a fuel metering system which avoids relevant rotational speed overshoots and thus permits an engine design which is more favorable with respect to its stability and weight.

This object is achieved according to the present invention.

The essence of the invention is the fact that the pressure control function for the main metering valve and the emergency function in the event of an unintentional opening of the main metering valve are combined in a single valve, here called recirculation valve, both functions being completely under the control of the engine controller, so that disadvantageous compensation effects are avoided. A secondary effect is the saving of components and weight.

BRIEF DESCRIPTION OF THE DRAWING

In the following, the invention will be explained in detail by means of the drawing. This drawing is a schematic representation of the essential elements of a fuel metering system.

BRIEF DESCRIPTION OF THE DRAWING

The fuel metering system 1 comprises a pipe system for the fuel which can roughly be divided into a feed pipe 4, a supply pipe 5 to the engine and a recirculation pipe 6 which leads back, for example, into a fuel tank. The feed pipe 4 is acted upon by fuel by way of a fuel pump 3. The maximal pressure in the pipe system is limited by a pressure limiting device 9 which automatically opens up to the recirculation pipe 6 and may be constructively integrated in the fuel pump 3. The main metering valve 7 is a central operating element which controls the supply of fuel to the engine. It has a servo motor 13 and a position generator 10 which, with respect to their control, are connected by way of transmission lines 15, 18 with the electronic engine controller 2. A pressure transducer 12 measures the pressure difference Δ by way of the main metering valve 7 and transmits the respective value by means of the transmission line 17 to the engine controller 2. A recirculation valve 8 with the servo motor 14 and the position generator 11 is also connected by means of transmission lines 16, 19 with the engine controller 2. In view of its differential pressure control function, a purely electric or electronic control is conceivable via the pressure generator 12→engine controller 2→servo motor 14. As an alternative, the figure shows a hydraulic pressure transmission directly into the recirculation valve 8 by way of the hydraulic pipes 20, 21—here indicated by a broken line, the fuel itself representing the hydraulic medium. In the pressure control operation as well as in the emergency operation, the recirculation valve 8, as required, opens up a flow connection from the feed pipe 4 to the recirculation pipe 6. Finally, it should be mentioned that the fuel metering system 1 is suitable for turbojet engines of all types, thus also for propeller turbojet engines (turboprop—Twke).

What is claimed is:

1. A fuel metering system for a turbojet engine, comprising:
    a feed pipe;
    a supply pipe to the engine;
    a recirculation pipe for excess fuel;
    a main metering valve at a transition from the feed pipe to the supply pipe and having a control-related connection with an electronic engine controller;
    control-related connections between the engine controller and a measuring device for the position of the main metering valve and a measuring device for the pressure difference of the main metering valve;
    an automatically-opening, pressure-limiting device for limiting maximal pressure in the feed pipe and having a flow connection to the recirculation pipe; and
    a recirculation valve comprising:
        a motor-driven adjusting device having a control-related connection with the electronic engine controller;
        a valve position-detecting device having a control-related connection with the electronic engine controller,
    wherein the recirculation valve keeps a pressure difference between an inlet and an outlet of the main metering valve constant and limits a fuel flow through the main metering valve if the main metering valve is unintentionally opened too far.

2. A fuel metering system according to claim 1, wherein the control-related connection between the engine controller the measuring device for the pressure difference of the main metering valve is an electronic connection for differential pressure control by the recirculation valve.

3. A fuel metering system according to claim 1, further comprising a direct hydraulic connection from the measuring device for the pressure difference of the main metering valve to the recirculation valve for differential pressure control by the recirculation valve.

4. A fuel metering system according to claim 1, wherein the pressure-limiting device is integrated in a fuel pump.

* * * * *